United States Patent [19]

Muralidhara

[11] 4,293,098

[45] Oct. 6, 1981

[54] RECOVERY OF ACTIVE CHITIN AND ENHANCED PROTEIN MEAL

[75] Inventor: H. S. Muralidhara, Falls Church, Va.

[73] Assignee: Systems Consultants, Inc., Washington, D.C.

[21] Appl. No.: 31,846

[22] Filed: Apr. 20, 1979

[51] Int. Cl.³ ............................................. B02C 19/00
[52] U.S. Cl. ....................................... 241/19; 241/24; 536/20
[58] Field of Search ................. 17/71; 53/121; 241/19, 241/24, 30, 79.1; 423/6; 536/20

[56] References Cited

U.S. PATENT DOCUMENTS 3,533,940  10/1970  Peniston et al. ................ 536/20 X
3,784,114   1/1974  Wolff et al. ......................... 241/24
3,862,122   1/1975  Peniston et al. ..................... 336/20

*Primary Examiner*—Mark Rosenbaum
*Attorney, Agent, or Firm*—Brady, O'Boyle & Gates

[57] ABSTRACT

Active chitin is recovered from shellfish waste in a mechanical process without chemical additives. Shellfish waste is subjected to drying followed by grinding and treatment in an air classifier to separate the same into two major components, one being predominately active chitin and the other being a heavier component of predominately protein and calcium carbonate, which is an enhanced protein meal. A screening process for the first major component further separates most of the calcium salts from the active chitin, and all components are then packaged and stored for further use.

4 Claims, 1 Drawing Figure

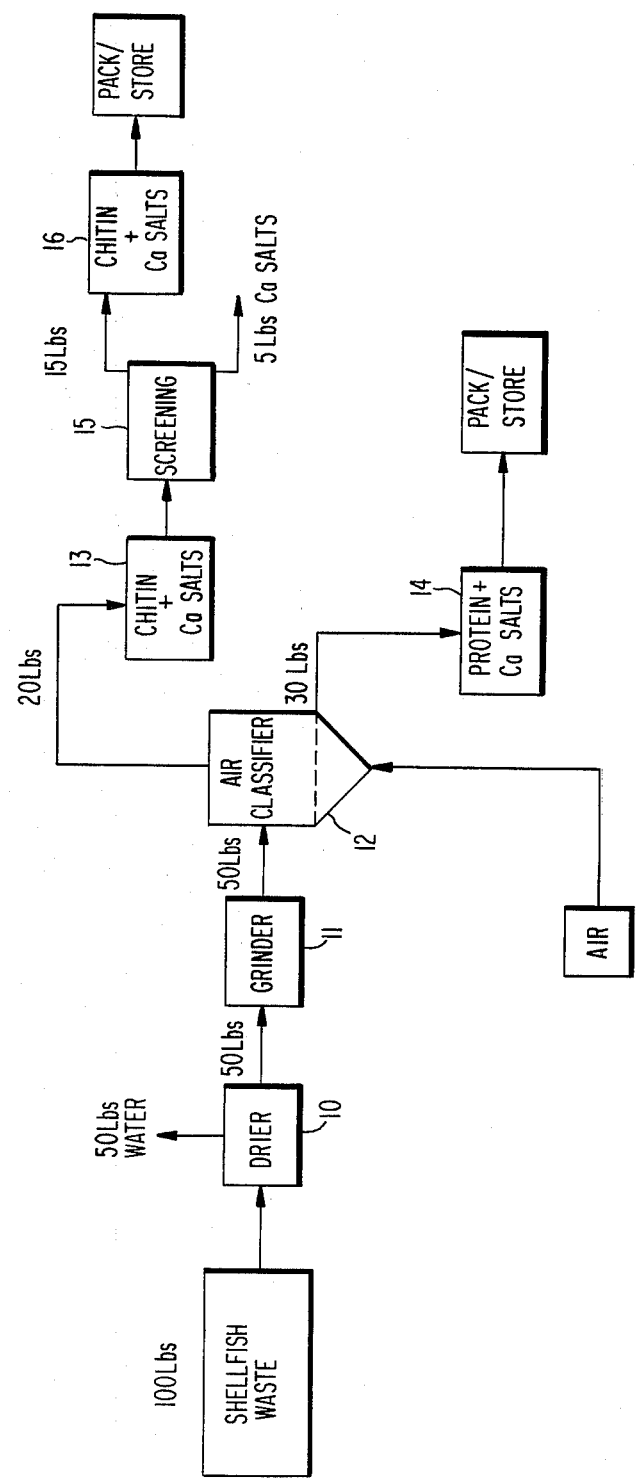

RECOVERY OF ACTIVE CHITIN AND ENHANCED PROTEIN MEAL

BACKGROUND OF THE INVENTION

Chitin is a naturally occurring polymer. It is found in crustaceans, mollusks, marine benthic organisms and krill fish. Chitin is also present in some fungi. The commercial utility of chitin and chitosans is well defined in prior art patents and other literature.

Extraction of chitin and chitosans is generally through a process of grinding and demineralization with different acid solutions, such as hydrochloric, sulfurous and acetic acids.

Derivatives of chitin, such as chitin sulfate, chitin xanthate and cyanoethylated chitosans have been prepared for use for a broad range of applications ranging from adsorbers to wound healing.

The present invention involves the separation of the protein fraction from the natural (active) chitin fraction of selected shellfish wastes in a sequence of drying, crushing, grinding, air classifying and screening operations, all mechanical steps, carried out without chemicals. The chemical processes of the known prior art are more expensive and more complicated and less easy to control.

The shellfish waste material from crabs, lobsters, shrimps, crayfish, king crabs, etc. obtained from a shellfish meat packing plant is dried to a suitable moisture content in a dried, such as a tray drier, rotary drier or fluid bed drier. The dried material is then ground in a ball, hammer or blade mill into groups of particle sizes that range between 10 microns and 400 microns. The grinding process fractures the dried waste material and results in fractionating the protein, chitin and calcium base materials. The ground fractionated material is then subjected to air classification. In this process, the lighter fraction blown from the top of the air classifier consists mainly of active chitin and some calcium salts. The heavier fraction falling to the bottom of the air classifier consists mainly of protein and calcium salts. The top fraction can be further subjected to screening to eliminate most of the calcium salts from the active chitin. Since the recovered chitin is produced in an essentially mechanical process without relying on chemicals, there are no chemical residues in the material which is essentially natural or active.

The differences between mechanically processed protein and active chitin and chemically prepared protein and chitin include the following. The chemically obtained chitin, during acid degradation, has some of its properties modified permanently. Such properties include optical activity, solubility, molecular weight, and conformation. There is also a degradation of some of the associated carotenoid pigments, viz. astaxanthin and astaxanthin ester.

Active chitin obtained by the mechanical process will retain the unique properties of the natural material including optical activity, molecular weight, acetyl values and molecular configuration. Chitin in its natural form consists of multiple units of $\beta$ glycosidic linkages and is naturally levorotatory. Also, active chitin has different biological activity from that which is produced from customary chemical treatments. These factors combine to make the natural product produced by the invention more useful for such things as chelation, flocculation, co-ordination, etc.

In addition to retaining all of the natural properties of chitin, the protein recovered by mechanical separation still contains the carotenoid pigments, astaxanthin and astaxanthin ester and the removal of some of its calcium salts along with chitin improves its carbon to nitrogen ratio and thus its food value. These properties make for a better quality and enhanced protein meal in comparison to the meal customarily produced from drying and direct grinding of shellfish wastes.

The recovered active chitin should serve as a better performing and more cost effective starting material for the manufacture of chemically produced chitin and chitosans, such as for biomedical applications, than the ground raw waste material presently used for chemically producing chitin and chitosans.

The accompanying drawing FIGURE forming a part of this application comprises a flow diagram of the process according to one example.

Referring to this diagram in detail, 100 pounds of shellfish waste obtained, for example, from a crab meat packing plant is dried to a suitable moisture content in a drier 10, such as one of the drier types previously identified. Approximately 50 pounds of water is removed from the waste and the remaining 50 pounds of dried waste is delivered to a grinder 11 which may be one of the types previously identified. The grinder reduces the 50 pounds of dried waste to particle sizes ranging between 10 and 400 microns. The grinding process fractures the dried waste material into significantly separated fractions. The separated fractions are protein, active chitin and calcium base materials. In the grinding process, the active chitin will emerge as a flaky or plate-like material and the calcium salts as a powdery material with about eight to ten times the density of the active chitin. The protein will be somewhat globular in form since it results from shellfish meat remaining in the waste material after normal meat picking. None of these materials is in pure form but will contain some small percent of the other materials.

The ground material is then delivered to an air classifier 12, wherein the lighter fractions of the material consisting of active chitin and some calcium salts, which have more lift than weight, amounting to a total of about 20 pounds, will float out or are blown out of the top of the air classifier, as shown in the flow chart at 13. The heavier material, amounting to a total of about 30 pounds in the example, settling to the bottom of the air classifier 12 consists of protein and calcium salts, indicated at 14. The recovered protein, which is actually enhanced protein meal, can then be packaged and stored for later use in poultry and animal feed products, and the like. The air classifier concept employed in the process utilizes particle size, shape and density of material to dictate the settling or lifting of particles in a created vertical air stream. By adjustment of this air stream velocity, material separation is accomplished.

The top or lighter fraction of material consisting primarily of active chitin and calcium salts, designated at 13 in the flow diagram, is preferably further subjected to screening at 15 to separate most of the calcium salts from the natural or active chitin in the amount of approximately 15 pounds as at 16, which recovered product may now be packaged and stored.

In terms of the equipment utilized in the practice of the method, the air classifier 12 can be an Ultraplex or Contraplex model air classifier manufactured by Alpine American Corp., or the type manufactured by Kennedy Van Saun Corporation, Danville, Pa. The grinder 11 may be a ball mill or hammer mill manufactured by Kennedy Van Saun Corporation, Danville, Pa. The Screening apparatus 15 may be of the vibratory type manufactured by Allis Chalmers Corp. Functionally equivalent apparatus components may be used in lieu of those identified above.

Among the applications or uses of the active chitin recovered in the process are in treatment of fluid streams related to:

(1) Water purification;
(2) Electroplating and metal finishing;
(3) Nuclear decontamination;
(4) Removal of trace organics, such as PCB and PBB;
(5) Recovery and removal of heavy metals and rare metals from waste;
(6) Textiles, photofinishing, emulsions, etc.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. In a process for recovering active chitin from shellfish waste consisting essentially of the steps:
    (a) drying said shellfish waste,
    (b) mechanically reducing the particle size of said dried shellfish waste to within the range of 10 to 400 microns,
    (c) subjecting the dried, reduced shellfish waste to the action of a gaseous stream to classify and separate a lighter fraction comprising active chitin and residual salts and a heavier fraction comprising protein and salts.

2. The process of claim 1 wherein said lighter fraction is screened to further separate the active chitin from residual salts.

3. The process of claim 1 wherein said particle size reduction is carried out by grinding.

4. The process of claim 1 wherein said gaseous stream is air.

* * * * *